US009428223B2

(12) United States Patent
Gilbert et al.

(10) Patent No.: US 9,428,223 B2
(45) Date of Patent: Aug. 30, 2016

(54) MOTOR VEHICLE SUPPORT STRUCTURE

(71) Applicant: Dr. Ing. h.c. F. Porsche Aktiengesellschaft, Stuttgart (DE)

(72) Inventors: Tassilo Gilbert, Pforzheim (DE);
Philipp Kellner, Stuttgart (DE);
Michael Junginger, Boeblingen (DE);
Frank Kunert, Bardowick (DE);
Sebastian Steinruecken, Olsberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/184,798

(22) Filed: Feb. 20, 2014

(65) Prior Publication Data
US 2014/0232136 A1    Aug. 21, 2014

(30) Foreign Application Priority Data

Feb. 20, 2013  (DE) .................. 10 2013 101 697

(51) Int. Cl.
*B62D 25/04* (2006.01)
*B62D 24/00* (2006.01)
*B62D 25/16* (2006.01)

(52) U.S. Cl.
CPC ............... *B62D 24/00* (2013.01); *B62D 25/04* (2013.01); *B62D 25/16* (2013.01)

(58) Field of Classification Search
CPC ............ B60R 19/00; B60R 2019/002; B60R 2019/007; B62D 21/15; B62D 21/152; B62D 21/155; B62D 25/02; B62D 25/04; B62D 25/08; B62D 25/20
See application file for complete search history.

(56) References Cited

U.S. PATENT DOCUMENTS

| 3,881,742 | A |   | 5/1975  | Felzer |
| 4,545,612 | A | * | 10/1985 | Harasaki ................. 296/203.02 |
| 5,011,201 | A | * | 4/1991  | Takahashi et al. ...... 296/203.02 |
| 5,213,391 | A | * | 5/1993  | Takagi ......................... 296/205 |
| 5,275,436 | A |   | 1/1994  | Pomero |
| 6,209,950 | B1 | * | 4/2001  | Hanyu ..................... 296/203.02 |
| 6,286,867 | B1 |   | 9/2001  | Braemig et al. |
| 6,511,119 | B2 |   | 1/2003  | Takase et al. |
| 6,631,942 | B1 | * | 10/2003 | Kitagawa .................. 296/187.1 |
| 6,994,374 | B2 | * | 2/2006  | Miyasaka ..................... 280/784 |
| 8,201,873 | B2 | * | 6/2012  | Nishimura et al. ...... 296/193.06 |
| 8,469,442 | B1 | * | 6/2013  | Pencak et al. .......... 296/187.12 |

(Continued)

FOREIGN PATENT DOCUMENTS

| DE | 198 35 705 | 2/2000 |
| DE | 198 38 955 | 3/2000 |

(Continued)

OTHER PUBLICATIONS

German Search Report of Nov. 8, 2013.

(Continued)

*Primary Examiner* — Glenn Dayoan
*Assistant Examiner* — Paul Chenevert
(74) *Attorney, Agent, or Firm* — Gerald E. Hespos; Michael J. Porco; Matthew T. Hespos

(57) ABSTRACT

A support structure is provided for a motor vehicle that has a front wheel (8). The support structure includes an A pillar (5) having a slide-off surface (40) for the front wheel. The slide-off surface for the front wheel (8) is inclined so that the front wheel (8) slides out along the slide-off surface (40).

7 Claims, 1 Drawing Sheet

(56) References Cited

U.S. PATENT DOCUMENTS

| | | | |
|---|---|---|---|
| 9,067,617 B2* | 6/2015 | Konchan et al. | B62D 9/00 296/187.1 |
| 9,187,133 B2* | 11/2015 | Rangaswamaiah et al. | B62D 25/04 296/30 |
| 9,233,716 B2* | 1/2016 | Midoun et al. | B62D 21/155 296/187.09 |
| 2001/0020797 A1* | 9/2001 | Saeki | 296/203.03 |
| 2001/0033096 A1* | 10/2001 | Hanyu | 296/203.01 |
| 2003/0090128 A1* | 5/2003 | Seksaria et al. | 296/192 |
| 2005/0046237 A1* | 3/2005 | Miyoshi et al. | 296/203.02 |
| 2009/0140551 A1* | 6/2009 | Stalhammar | B62D 25/04 296/193.06 |
| 2011/0156446 A1* | 6/2011 | Iwase | B62D 25/025 296/193.06 |
| 2011/0260501 A1* | 10/2011 | Faruque et al. | 296/187.03 |
| 2012/0153679 A1* | 6/2012 | Yasuhara et al. | 296/203.02 |
| 2012/0161475 A1* | 6/2012 | Mori | 296/193.06 |
| 2013/0320709 A1* | 12/2013 | Kuwabara et al. | 296/187.09 |
| 2014/0091593 A1* | 4/2014 | Obayashi et al. | 296/187.1 |
| 2014/0225396 A1* | 8/2014 | Mochizuki | 296/187.09 |
| 2015/0008703 A1* | 1/2015 | Furusaki et al. | 296/187.08 |
| 2015/0084373 A1* | 3/2015 | Nagasawa | 296/187.1 |
| 2015/0166112 A1* | 6/2015 | Chung | 296/187.1 |
| 2015/0298744 A1* | 10/2015 | Winberg et al. | B62D 27/023 296/187.09 |
| 2015/0344073 A1* | 12/2015 | Midoun et al. | B62D 21/155 296/187.1 |
| 2016/0001727 A1* | 1/2016 | Watterworth et al. | B62D 21/152 280/784 |
| 2016/0052554 A1* | 2/2016 | Ozawa | B62D 21/152 296/187.09 |
| 2016/0107699 A1* | 4/2016 | Panganiban et al. | B62D 25/025 296/187.09 |

FOREIGN PATENT DOCUMENTS

| | | | | |
|---|---|---|---|---|
| DE | 199 56 430 | | 5/2001 | |
| DE | 10 2005 050 959 | | 7/2007 | |
| DE | 10 2011 085 673 | | 5/2012 | |
| DE | 102012004682 A1 * | | 9/2013 | B62D 21/15 |
| DE | 102012004683 A1 * | | 9/2013 | B60R 19/00 |
| EP | 0 980 815 | | 2/2000 | |
| EP | 1 044 863 | | 4/2000 | |
| EP | 1070655 A2 * | | 1/2001 | B62D 21/15 |
| EP | 1 278 674 | | 1/2002 | |
| EP | 1270375 | | 1/2003 | |
| GB | 2513950 A * | | 11/2014 | B62D 21/15 |
| JP | 07-267148 | | 10/1995 | |
| JP | 11-342869 | | 12/1999 | |
| WO | 2013/121890 | | 8/2013 | |
| WO | WO 2014155539 A1 * | | 10/2014 | B62D 25/20 |

OTHER PUBLICATIONS

British Patent Application GB 1402671.0 Search Report—Sep. 2, 2014.

* cited by examiner

MOTOR VEHICLE SUPPORT STRUCTURE

CROSS REFERENCE TO RELATED APPLICATION

This application claims priority under 35 USC 119 to German Patent Appl. No. 10 2013 101 697.9 filed on Feb. 20, 2013, the entire disclosure of which is incorporated herein by reference.

BACKGROUND

1. Field of the Invention

The invention relates to a motor vehicle support structure having an A pillar, a front wheel and a slide-off surface for the front wheel.

2. Description of the Related Art

EP 1 278 674 B1 discloses a body front-end arrangement for a motor vehicle, having a front wheel, a motor vehicle body component and a front wheel transverse guide. The front wheel transverse guide is arranged on a front end of a door sill and comprises a guide part for displacing the front wheel inward in the width direction of the motor vehicle in the event of a front-on collision of the motor vehicle. EP 1 044 863 A1 discloses a motor vehicle having a support structure with a crumple zone at one end of a passenger safety cell and two wheel arches arranged on the sides in the region of the crumple zone. Each wheel is held by wheel control elements arranged in the wheel arches. Deflection surfaces are provided between the passenger safety cell and the rolling circumference of the respective wheels in the straight-ahead position. Each deflection surface is oblique to the longitudinal central axis of the motor vehicle. Thus, a wheel will move onto the deflection surface in the event of a crash-induced deformation of the crumple zone, and the wheel will be deflected past the face side of the passenger safety cell. Additionally, the deflection surfaces are oriented obliquely down and function as deflection ramps that guide the wheels down under the floor of the motor vehicle during a collapse of the crumple zone in the direction of the passenger safety cell. DE 198 38 955 A1 discloses a vehicle body having a deformation element between an A pillar and the wheels of the vehicle.

It is an object of the invention to provide a simple, inexpensive, light weight, easily produced motor vehicle support structure having an A pillar, a front wheel and a slide-off surface for the front wheel.

SUMMARY OF THE INVENTION

The invention relates to a motor vehicle support structure having an A pillar, a sill, a front wheel and a slide-off surface for the front wheel. The slide-off surface for the front wheel is formed on the A pillar and is inclined so that the front wheel slides out along the slide-off surface in the event of a front-on crash. The slide-off surface may be formed entirely or partially on the A pillar. The simple slide-off surface of the invention reduces the probability of the front wheel becoming wedged with the A pillar in a specific crash situation in which the motor vehicle impacts a rounded barrier with an overlap of between 20% and 30%. This advantageously prevents a major part of the forces that act on the front wheel from being transmitted to a passenger cell of the motor vehicle. The sliding-off motion of the front wheel along the A pillar yields the advantage that the passenger compartment can be smaller. In this way, high demands for crash safety can be met in the specific crash load situation, while having the weight of the vehicle be as low as possible. The use of the A pillar as the slide-off surface affords the advantage omitting additional components. Finally, a wheel arch curve for the front wheel can remain unchanged.

A preferred exemplary embodiment of the motor vehicle support structure is characterized in that a front A pillar flange region is arranged toward a centre of the vehicle. The A pillar is advantageously formed from at least two profile elements. As viewed in cross section through the A pillar, the two profile elements are fixedly connected to one another by means of in each case two front flanges and two rear flanges in the front A pillar flange region and in the rear A pillar flange region. Here, the A pillar flange regions may be arranged centrally as viewed in the vehicle transverse direction and with respect to the A pillar. The relocation, according to the invention, of the front A pillar flange region inward toward the centre of the vehicle proceeding from the centre of the pillar has the effect of considerably improving the sliding-off motion of the front wheel along the A pillar.

A further preferred exemplary embodiment of the motor vehicle support structure is characterized in that a front bulkhead is fastened at the inside to the front A pillar flange region. This has the effect of considerably simplifying outlay in terms of assembly. Furthermore, the front bulkhead can advantageously be used together with the A pillar to form the slide-off surface.

A further preferred exemplary embodiment of the motor vehicle support structure is characterized in that the front bulkhead comprises a cross member. The cross member is preferably arranged behind the bulkhead as viewed in the vehicle longitudinal direction. In this respect, the A pillar is supported inwardly by means of the bulkhead or the cross member thereof.

A further preferred exemplary embodiment of the motor vehicle support structure is characterized in that the front bulkhead is inclined such that, in the event of a front-on crash in relation to the front wheel, the front wheel slides outward along the front bulkhead. The slide-off surface according to the invention particularly advantageously arises from a combination of the A pillar with the front bulkhead. In the specific crash situation mentioned above, the front wheel slides outward, that is to say away from the centre of the vehicle, initially along the front bulkhead and subsequently along the A pillar.

A further preferred exemplary embodiment of the motor vehicle support structure is characterized in that the front bulkhead and a front face surface of the A pillar jointly form a slide-off surface for the front wheel. For this purpose, the front bulkhead and the front face surface of the A pillar may be inclined at a similar angle of inclination.

The invention also relates to a motor vehicle having a motor vehicle support structure as described above. The motor vehicle support structure is in this case advantageously arranged symmetrically on both sides with respect to a vehicle longitudinal axis.

Further advantages, features and details of the invention will emerge from the following description, in which various exemplary embodiments are described in detail with reference to the drawing.

DETAILED DESCRIPTION OF THE PREFERRED EMBODIMENTS

Figure 1:
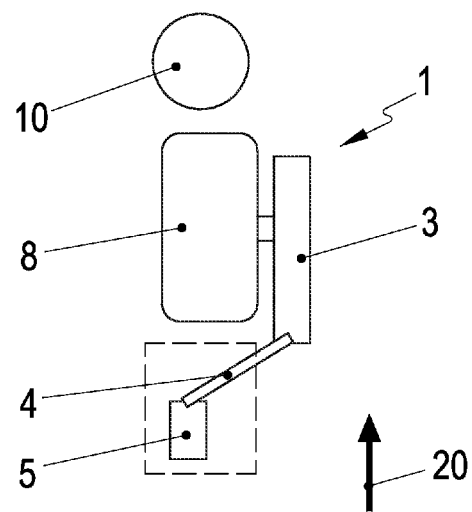
FIG. 1 is a simplified illustration of a motor vehicle support structure with a front wheel and a bollard in front of the front wheel to illustrate a specific crash load situation.

FIG. 1 is a simplified illustration of a motor vehicle support structure 1 having a longitudinal structure 3, a bulkhead 4 and an A pillar 5. A front wheel 8 is rotatably mounted on the longitudinal structure 3. A bollard 10 is in front of the front wheel 8 to illustrate a specific crash load situation.

The specific crash load situation relates to a crash test referred to as the small-overlap crash test. In the small-overlap crash test, the motor vehicle impacts against a rounded rigid barrier, such as the bollard 10 in FIG. 1, with a twenty-five percent overlap. A deformation occurs in this specific crash load situation, and, if the motor vehicle is regarded as a fixed point, the load is transmitted via the bollard 10 indirectly onto a sill longitudinal structure via the front wheel 8.

The longitudinal structure 3 of the front wheel 8 is not subjected to loads in this specific crash load situation. If the front wheel 8 does not slide off and instead becomes wedged with the A pillar 5, a major part of the acting forces are transmitted from the front wheel 8 to a passenger cell. To design the passenger cell with the smallest possible dimensions, it is desirable for the front wheel 8 to slide off along the A pillar 5.

Figure 2:
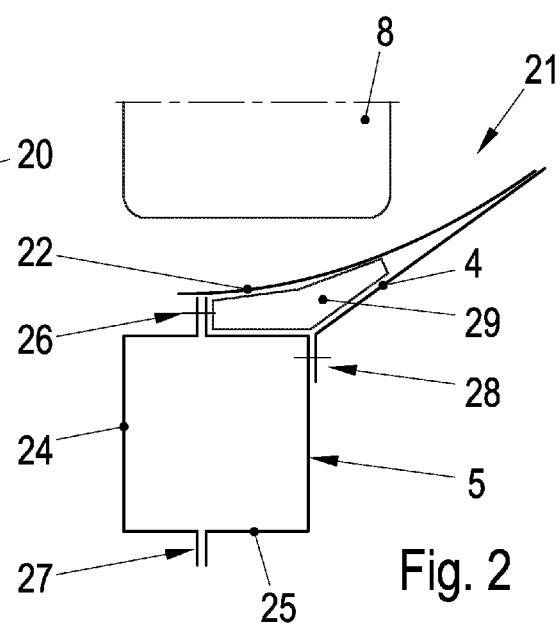
FIG. 2 shows motor vehicle structure similar to FIG. 1, with an additional filler element.

The arrow 20 in FIG. 2 indicates a direction of travel of a motor vehicle having a motor vehicle support structure 21. A wheel arch surface or curve 22 faces toward the front wheel 8. The motor vehicle support structure 21 comprises an A pillar 5 that is assembled from two profile elements 24, 25.

The profile elements 24, 25 are connected fixedly to one another in a front flange region 26 and in a rear flange region 27. A connection point 28 is provided on the profile element 25 at the front right in FIG. 2 for connecting a bulkhead 4 to the A pillar 5. The sliding-off motion of the vehicle wheel 8 along the A pillar 5 may be improved by a filler element 29 arranged rearward of the wheel arch surface 22 and forward of the profile element 25 and the bulkhead 4.

Figure 3:
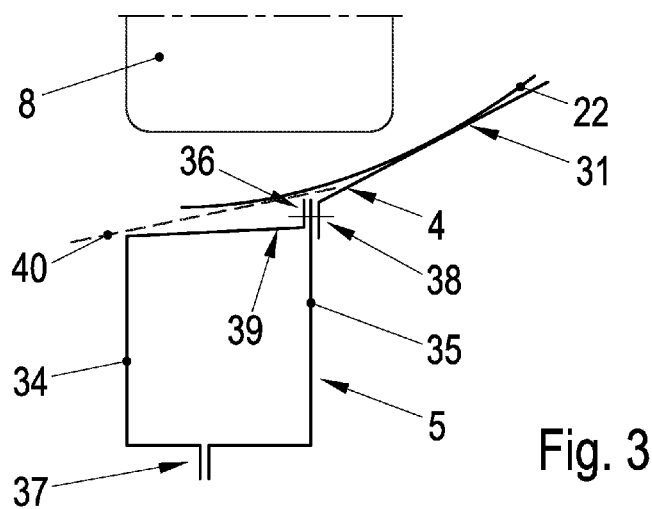
FIG. 3 is a simplified illustration of a motor vehicle support structure according to the invention.

FIG. 3 illustrates, in simplified form, a motor vehicle support structure 31 according to the invention with a bulkhead 4, an A pillar 5 and a front wheel 8. The A pillar 5 is formed from two profile elements 34, 35 that are connected fixedly to one another in a front flange region 36 and in a rear flange region 37. The rear flange region 37 is designed and arranged in exactly the same way as the rear flange region 27 of FIG. 2.

The front flange region 36 of FIG. 3 has been relocated toward the center of the vehicle, as compared to the front flange region 26 of FIG. 2, so that the front flange region 36 is on the front inner side of the A pillar 5. Thus, the bulkhead 4 advantageously can be fastened directly to the front flange region 36 at a connection point 38.

A front limb 39 of the profile elements 34 is inclined slightly, as shown in FIG. 3. The bulkhead 4 is inclined at a greater angle.

A dashed line 40 indicates a slide-off surface along which the front wheel 8 slides off in the specific crash load situation described above. The relocation and displacement of the front flange region 36 of the A pillar 5 inward and toward the center of the vehicle, in accordance with the invention, creates a natural slide-off surface 40 in a simple manner. The slide-off surface 40 yields the advantage that no additional components are required. Furthermore, the slide-off surface 40 can be realized without the cross section of the A pillar 40 being significantly reduced.

What is claimed is:

1. A support structure for a motor vehicle that has a front wheel, the support structure comprising:
    an A pillar arranged rearward of the front wheel, the A pillar having a front end facing the front wheel, a back end opposite the front end, and opposite outer and inner sides extending between the front and back ends with the inner side facing a center of the vehicle, the A pillar being formed by first and second profiles, the first profile defining the front end, the outer side and a part of the back end of the A pillar, the second profile defining the inner side and a part of the back end of the A pillar, the first and second profiles being joined to one another at front and rear flanges, the front flange being arranged at a region of the front end of the A pillar aligned with the inner side and projecting forward at the front end, the rear flange being at the back end of the A pillar;
    a front bulkhead having a front end forward of the A pillar and closer to the center of the vehicle than the A pillar and a rear end;
    a bulkhead flange extending rearward from the rear end of the front bulkhead and fastened with the first and second profiles at the front flange of the A pillar; and
    a wheel arch defining a continuous concave surface facing toward the front wheel, the wheel arch extending from a position on a front surface of the front bulkhead forward of the A pillar and closer to the center of the vehicle than the A pillar and being sloped rearward continuously across the front flange and toward the outer side so that the wheel arch, the front bulkhead and the A pillar cooperate to define a slide-off surface, wherein
    the front wheel slides out along the slide-off surface away from the center of the vehicle in the event of a front on crash.

2. The support structure of claim 1, wherein the front end of the front bulkhead is combined with a longitudinal structure.

3. A motor vehicle having the support structure of claim 1.

4. The support structure of claim 1, wherein the rear end of the front bulkhead is aligned with a front end of the front flange of the A pillar.

5. The support structure of claim 1, wherein the front end of the A pillar is inclined rearward at a first angle from the inner side to the outer side of the A pillar, and wherein the front bulkhead is inclined rearward at a second angle from the front end of the front bulkhead to the rear end thereof, the second angle being greater than the first angle.

6. The support structure of claim 1, wherein the front bulkhead is inclined so that, in the event of a front-on crash, the front wheel slides out along the front bulkhead.

7. The support structure of claim 6, wherein the front bulkhead and a front face surface of the A pillar jointly form the slide-off surface for the front wheel.

* * * * *